United States Patent [19]
Anwyl et al.

[11] Patent Number: 5,576,738
[45] Date of Patent: Nov. 19, 1996

[54] DISPLAY APPARATUS WITH MEANS FOR DETECTING CHANGES IN INPUT VIDEO

[75] Inventors: Edward Anwyl, Eastleigh; John Beeteson, Skelmorlie; Shaun Kerigan, Kilmalcolm; Andrew Knox, Kilbirnie, all of Great Britain; Peter Martinez, Boca Raton, Fla.

[73] Assignee: International Business Machines Corporation, Armonk, N.Y.

[21] Appl. No.: 237,708

[22] Filed: May 3, 1994

[30] Foreign Application Priority Data

Sep. 24, 1993 [GB] United Kingdom ............... 9319766

[51] Int. Cl.$^6$ ................... G09G 5/00; G06F 1/00
[52] U.S. Cl. ................................ 345/212; 364/707
[58] Field of Search .................... 345/117, 211, 345/212, 213, 904, 97, 98, 100, 99; 364/707

[56] References Cited

U.S. PATENT DOCUMENTS

| | | | |
|---|---|---|---|
| 5,173,940 | 12/1992 | Lantz et al. | 345/172 |
| 5,247,286 | 9/1993 | Ishikawa | 345/211 |
| 5,313,225 | 5/1994 | Miyadera | 345/211 |
| 5,321,811 | 6/1994 | Kato et al. | 395/166 |
| 5,375,245 | 12/1994 | Solhjell et al. | 345/212 |
| 5,389,952 | 2/1995 | Kikinis | 345/212 |

FOREIGN PATENT DOCUMENTS

| | | | |
|---|---|---|---|
| 0368117 | 5/1990 | European Pat. Off. | 345/97 |
| 0404182 | 12/1990 | European Pat. Off. | 345/212 |
| 0572143 | 12/1993 | European Pat. Off. | 345/97 |
| 5053537 | 3/1993 | Japan | 345/97 |
| 6059653 | 3/1994 | Japan | 345/212 |
| 6059655 | 3/1994 | Japan | 345/212 |
| 9423413 | 10/1994 | WIPO | 345/212 |

*Primary Examiner*—Richard Hjerpe
*Assistant Examiner*—Kara Farnandez Stoll
*Attorney, Agent, or Firm*—Perman & Green

[57] ABSTRACT

Display apparatus comprises a display screen (400) and a drive circuit (401) connected to the display screen (400) to generate an image on the display screen (400) in response to an input video signal (R,G,B). A timer (405) generates a count in response to a clock signal. A detector (403,404,402) also receives the input video signal and resets the timer (405) on detection of a change in image content between successive frames of the input video signal (R,G,B). Control means (402) is connected to the timer (405) and to the drive circuit (401) for at least partially disabling the drive circuit (401) in response to the count stored in the timer (405) exceeding a predetermined threshold.

9 Claims, 7 Drawing Sheets

DISPLAY APPARATUS WITH MEANS FOR DETECTING CHANGES IN INPUT VIDEO

BACKGROUND OF THE INVENTION

Field of the Invention

The present invention relates to display apparatus with means for detecting quiescence in input video to provide power management.

INTRODUCTION TO THE INVENTION

Conventional computer systems generally include a computer system unit, a visual display unit for displaying computer data generated in the computer system unit, and a keyboard for entering data to the computer system unit. In some conventional computer systems, power management in the display is provided by detection of keyboard activity in the system unit. If the operator leaves such a computer system unattended for a period of time, the system unit instructs the display to reduce the brightness and/or the size of the image displayed. The system unit instructs the display to restore the brightness and/or size of the image displayed on detection of the next keyboard entry made by the operator. In other conventional computer systems, such power management cannot be provided in the display because the system unit has no way of communicating instructions to the display.

SUMMARY OF THE INVENTION

In accordance with the present invention, there is now provided display apparatus comprising: a display screen; and a drive circuit for receiving an input video signal, the drive circuit being connected to the display screen to generate an image on the display screen in response to the input video signal; characterised in that the apparatus comprises: a timer for generating a count in response to a clock signal; a detector for receiving the input video signal and for resetting the timer on detection of a change in image content between successive frames of the input video signal; and control means connected to the timer and to the drive circuit for at least partially disabling the drive circuit in response to the count stored in the timer exceeding a predetermined threshold.

This advantageously permits power management to be provided in the display apparatus independently of the system unit. Power management can therefore be effected in display apparatus of the present invention regardless of the system unit to which the display is attached.

In a preferred embodiment of the present invention, the detector comprises: a frame store for storing at least a portion of a frame of the input video signal; a comparator connected to the frame store for comparing the portion of the frame of the video signal stored in the frame store with a corresponding portion of the next frame of the input video signal; and means for resetting the timer if the comparator determines that the portion of the frame of the video signal stored in the frame store is different to the corresponding portion of the next frame of the input video signal.

In another preferred embodiment of the present invention, the detector comprises: thresholding means for generating a pulse signal in response to transitions in the input video signal across a predetermined threshold; a counter for counting pulses of the pulse signal to generate a pulse count indicative of the number of transitions in the input video signal; means for resetting the counter at the beginning of each frame of video signal; a comparator for comparing the pulse count in the counter at the end of a first frame of the input video signal with the pulse count in the counter at the end of the next frame of the input video signal; and means for resetting the timer if the comparator determines that the pulse counts corresponding to successive frames of the input video signal are different.

In a further preferred embodiment of the present invention, the detector comprises: thresholding means for generating a pulse signal in response to transitions in the input video signal across a predetermined threshold; a cyclic redundancy checksum generator for generating a checksum as a function of the pulse signal; means for resetting the checksum generator at the beginning of each frame of the input video signal; a comparator for comparing the checksum generated by the checksum generator at the end of a first frame of the input video signal with the checksum generated by the checksum generator at the end of the next frame of the input video signal; and means for resetting the timer if the comparator determines that the checksums corresponding to successive frames of the input video signal are different.

The detector preferably comprises: cursor filtering means for detecting a flashing cursor component of the input video signal as a function of the checksums corresponding to successive frames of the input video signal; and means for resetting the timer if the comparator determines that the checksums corresponding to successive frames of the input video signal are different unless the difference between the checksum is determined by the cursor filtering means to correspond to a flashing cursor component of the input video signal. This advantageously permits power management to be effected in display apparatus of the present invention even when the display image includes a flashing cursor.

The cursor filtering means preferably identifies a flashing cursor component of the input video signal by detecting a periodicity in the checksums corresponding to successive frames or groups of frames of the input video signal. This advantageously permits power management to be effected when more than one frame refresh is used to fully write the cursor to the display screen.

The thresholding means can include a comparator configured to act as an edge detector for generating the pulse signal in response to transitions in the input video signal across a single threshold. This is particularly useful for effecting power management from a digital video input to the display device.

In a preferred embodiment of the present invention, the thresholding means comprises a plurality of comparator means each for generating an output signal in response to transitions in the video signal across a different threshold level, and an exclusive or gate for generating the pulse signal as a function of a combination of the output signals from the comparator means. This is particularly useful for effecting power management from an analog video input to the display device because it advantageously permits detection of both larger and smaller amplitude transitions in input video signals corresponding to, for example, relatively dim text or graphics superimposed on relatively bright backgrounds. The grater the number of threshold levels, the greater the sensitivity of the detector.

A particularly preferred embodiment of the present invention, the thresholding means comprises first comparator means for generating a first signal in response to transitions in the video signal across a first predetermined threshold, second comparator means for generating a second signal in response to transitions in the video signals across a second predetermined threshold level lower than the first predetermined threshold level, and an exclusive or gate for generating the pulse signal as a function of a combination of the first and second signals.

In yet another preferred embodiment of the present invention, the detector comprises: an integrator for integrating the input video signal to generate an output level; an analog to digital convertor for generating a digital word as a function of the output level at the end of each frame of the input video signal; means for resetting the integrator at the beginning of each frame of the input video signal; and a comparator for comparing the digital word generated by the analog to digital convertor at the end of a first frame with the digital word generated by the analog to digital convertor at the end of the next frame; the detector resetting the timer if the comparator determines that the digital words corresponding to successive frames of the input video signal are different.

The analog to digital convertor is preferably adapted to generate the digital word in Gray Code. Thus, only one bit of the digital word changes between successive digital values. This advantageously improves the noise immunity of the detector.

It will be appreciated that the present invention extends to a computer system comprising display apparatus of the kind hereinbefore described with reference to the present invention together with a processor unit for generating the input video signal to generate an image on the screen of the display apparatus, and a data input device for inputting data and commands to the processor unit.

BRIEF DESCRIPTION OF THE DRAWING

Preferred embodiments of the present invention will now be described, by way of example only, with reference to the accompanying drawings, in which.

DETAILED DESCRIPTION OF THE INVENTION

Figure 1:
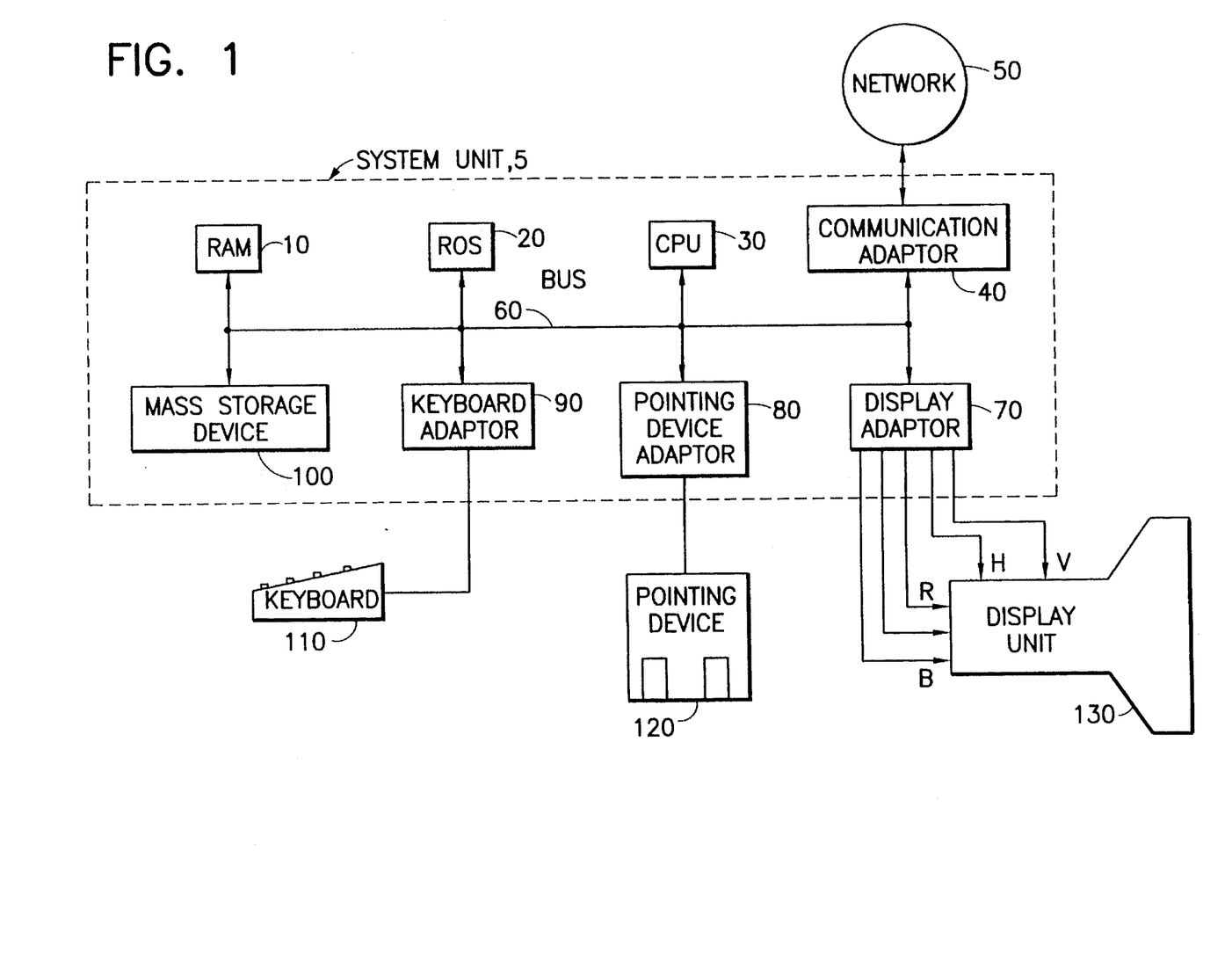
FIG. 1 is a block diagram of a computer system including a display device of the present invention.

Referring first to FIG. 1, a computer system comprises a system unit 5 including a random access memory (RAM) 10, a read only store (ROS) 20, a central processing unit (CPU) 30, a communication adaptor 40, a display adaptor 70, a pointing device adaptor 80, a keyboard adaptor 90, and a mass storage device 100 as a hard disk drive or tape streamer for example, all interconnected by a bus architecture 60. System unit 5 is connected via adaptor 90 to a keyboard 110. A pointing device 120 such as a touch screen, a tablet, or a mouse is connected to system unit 5 via adaptor 80. System unit 5 is also connected via adaptor 70 to a display 130 such as a cathode ray tube (CRT) display or a liquid crystal display for example. A network 50 of other system units is connected to system unit 5 via communication adaptor 40.

In operation, CPU 30 processes data stored in a combination of RAM 10 and mass storage device 100 under the control of computer program code stored in a combination of ROS 20, RAM 10, and mass storage device 100. Communication adaptor 40 controls transfer of data and computer program code between system unit 5 and other system units in network 50 through communication adaptor 40. Keyboard and mouse adaptors 90 and 80 permit data and instructions to be manually entered into system unit 5 from keyboard 110 and pointing device 120 respectively. Display adaptor 70 translates output data from system unit 5 into video signals, R, G and B, and horizontal and vertical picture synchronisation (sync) signals, H and V, for configuring display 130 to generate a visual data output. Bus architecture 60 coordinates data transfer between RAM 10, ROS 20, CPU 30, storage device 100, and adaptors 40, 90, 80 and 70.

Figure 2:
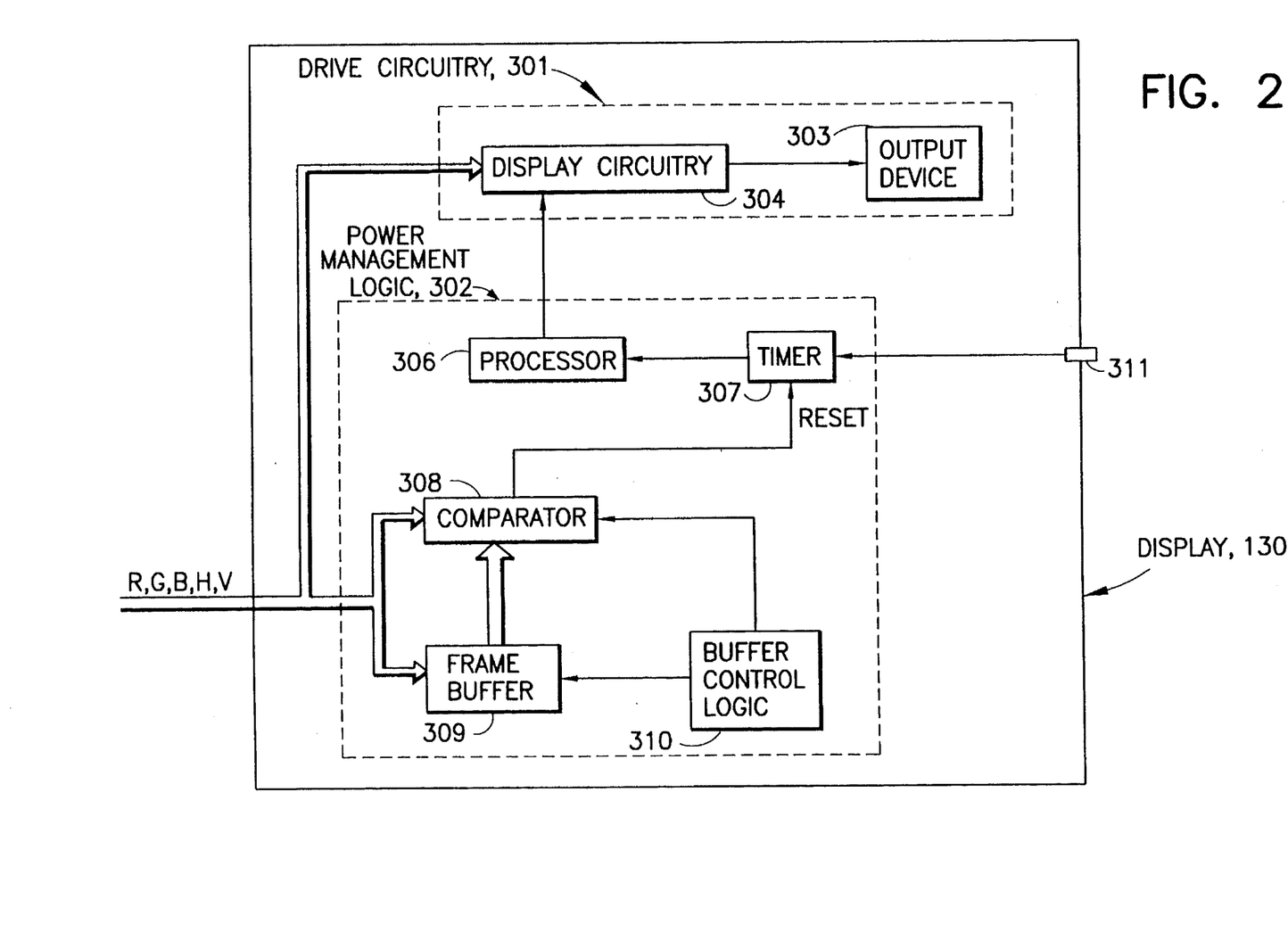
FIG. 2 is a block diagram of a display device of the present invention.

Referring now to FIG. 2, display 130 comprises drive circuitry 301. Drive circuitry 301 comprises an output device 303 such as a cathode ray tube or a liquid crystal display panel for example. Output device 303 is connected to display circuitry 304. Display circuitry 304 is connectable to video signals R, G, and B and sync signals H and V generated by display adaptor 70. In operation, display circuitry 304 drives output device 303 to display an image on the screen of display 130 in response to video signals R, G and B and sync signals H and V.

Display 130 is further provided with power management logic 302 comprising a processor 306 for controlling display circuitry 304. The output of a timer 307 is connected to processor 306. In operation, when the display device 130 is turned on, timer 307 begins incrementing a clock count. Timer 307 has a reset input connected to the output of a comparator 306 for resetting the clock count. A display screen buffer 309 is connected to one input of comparator 308. The other input of comparator 308 and the input to buffer 309 are connected to the video signals input to display 130. Buffer 309 is a digital frame-store connected to receive, digitise, and store the R, G, and B video signals input to display 130 from display adaptor 70. Buffer control logic 310 is connected to comparator 308 and buffer 309.

In an embodiment of the present invention, buffer 309 has sufficient capacity to store an entire frame of input video data. The contents of buffer 309 is refreshed by each successive frame of input video signals. Buffer control logic 310 synchronises addressing of buffer 309 to the input sync signals H and V during each frame refresh. Comparator 308 detects any change in screen content between successive frames by comparing input video data defining the next frame to be displayed with corresponding video data defining the previous frame displayed. If a change is detected, comparator 308 resets the clock count in timer 307. If no change is detected, timer 307 continues to increment the clock count. When the clock count reaches a predetermined a threshold, the output of the timer triggers processor 306 to deactivate at least the high voltage portions of display circuitry 304, thereby reducing the power consumption of display device 130 during dormant periods. When a subsequent change in screen content is detected, comparator 308 resets the clock count stored in timer 307. The output of timer 307 changes, thereby signalling processor 306 to reactivate display circuitry 304. Display device 130 is thus brought out of low power "standby mode" in response to change in screen content to displayed. Output device 303 is reactivated by reactivated display circuitry 304 to display the changed screen content. The threshold in timer 307 can be adjusted by the operator via an interval control 311 on display device 130.

In the embodiment of the present invention hereinbefore described, buffer 309 had sufficient capacity to store an entire frame of input video data. However, in a modification of the embodiment hereinbefore described, buffer 309 is capable of storing only a portion of a frame of input video data. The portion is selected to correspond to the area of screen content most likely to change. In operation, the stored portion is compared with the corresponding part of the input video data as described in the preceding paragraphs. The portion may be selected to include the cursor home position on the screen. Alternatively, the portion may correspond to the top line or to the bottom line of the screen. In another modification of the embodiment hereinbefore described, display device 130 is provided with user controls for adjusting the horizontal and vertical boundaries of the area of the screen to be monitored. The controls allow the operator to to preset the boundaries in accordance with the screen data produced when display device 130 is used in a particular application such as, for example, to display computer data in windows on the screen.

It will be appreciated that in the embodiments of the present invention hereinbefore described, power management logic 302 may be implemented by hard-wired logic gates, or by a microprocessor under the control of computer program code, or by a combination of hard-wired logic gates and a microprocessor.

Figure 3:
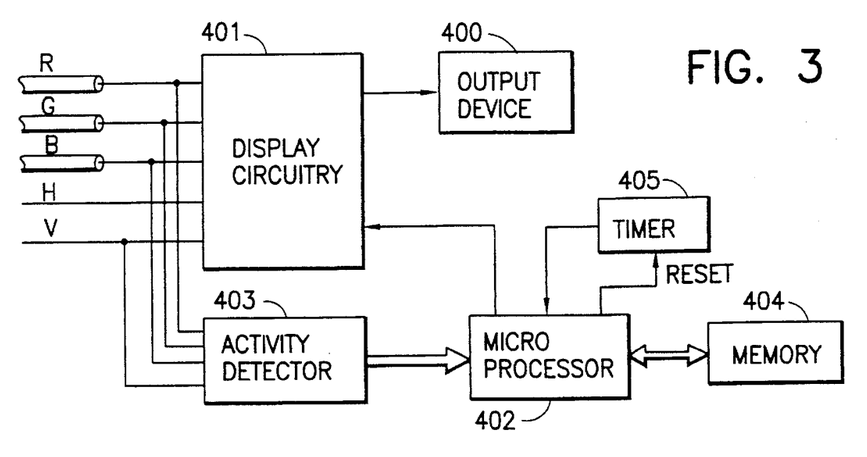
FIG. 3 is a block diagram of another display device of the present invention.

Turning now to FIG. 3, in a further embodiment of the present invention, display device 130 comprises an output device 400 such as a cathode ray tube or a liquid crystal display panel for example. Output device 400 is connected to display circuitry 401. Display circuitry 401 is connectable to video signals R, G, and B and sync signals H and V generated by display adaptor 70. In operation, display circuitry 400 drives output device 401 to display an image on the screen of display 130 in response to video signals R, G and B and sync signals H and V. A processor 402, such as a microprocessor for example, has outputs connected to display circuitry 401. Processor 402 is connected to a memory 404. An input to processor 402 is connected to the output of an activity detector 403. Another input to processor 402 is connected to the output of a timer 405. Timer 405 has a reset input (RESET) connected to an output of processor 402. Activity detector 403 receives video signals R, G and B and sync signals H and V input to display circuitry 401.

Figure 4:
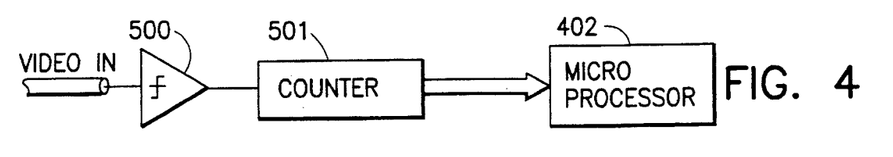
FIG. 4 is a block diagram of an activity detector of a display device of the present invention.

Referring now to FIG. 4, a preferred example of activity detector 403 comprises a thresholding circuit 500 and an N bit counter 501 for each of the video inputs R, G, and B to display device 130. The output of threshold circuit 500 is connected to the clock input of counter 501. The input of threshold circuit 500 is connected to a corresponding one of the video inputs R, G or B. The output of counter 501 is connected to processor 402.

In operation, thresholding circuit 500 produces a transition at its output each time the corresponding video input R, G, or B, crosses a predetermined threshold. N bit counter 501 maintains a count of the transitions at the output thresholding circuit 500. N is selected to ensure that the count will not overflow the counter length during one frame of input video. For each frame, the count is incremented by every crossing and recrossing of the threshold. Because each frame of video is bounded by frame sync pulses, accurate acquisition of a count corresponding to a frame of video input can be assured by gating the count with the frame sync signal. Furthermore, the frame sync signal is connected to a reset input (not shown) of counter 501 to reset the count at the end of each frame in preparation for the next frame. In preferred embodiments of the present invention, a sync normaliser circuit (not shown) is disposed between the reset input of the counter and the incoming frame sync signal to permit use of activity detector 402 with frame sync pulses of either polarity. The leading edge of each normalised frame sync pulse is used to signal the end of transition acquisition to processor 402 and the trailing edge of each normalised sync pulse is used to reset counter 501. Processor 402 reads the count stored in counter 501 on receipt of the trailing edge of each normalised sync pulse.

Figure 5:
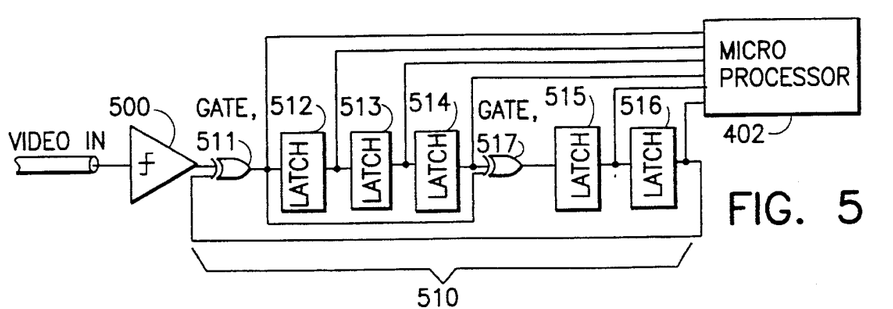
FIG. 5 is a block diagram of another activity detector of a display device of the present invention.

Referring now to FIG. 5, in another preferred example of activity detector 403, thresholding circuit 500 is retained, but counter 501 is replaced by an N bit shift register 510 comprising shift register latches 512 to 516 and Exclusive Or (EOR) gates 511 and 517. EOR gates 511 and 517 provide feedback paths within shift register 510 to configure shift register 510 in accordance with a generating primitive polynomial for producing Cyclic Redundancy Check (CRC). The generating polynomial is $1+x^{}3+x^{}6$. However, it will be appreciated that, in other embodiments of the present invention, different generating polynomials may be used. In operation, shift register 510 produces a CRC of the video transitions on each video input R, G, and B crossing the threshold. The same gating, reset at the start of each frame, and transfer at the end of each frame as hereinbefore described with reference to FIG. 4 are equally applicable to the arrangement of FIG. 5.

The predetermined thresholds in the examples of the present invention described above with reference to FIGS. 4 and 5 are selected in accordance with the R, G and B video outputs of adaptor 70. Typically, in a text mode such as a VGA text mode provided by Disk Operating System (DOS) software, the brightness of each character is assigned a hex brightness value of 2A out of a maximum of 3 F by the Basic Input Output System (BIOS) of the display system. The hex brightness values are translated into output video voltages in adaptor 70 by a digital to analog convertor (DAC). 2A out of a maximum 3 F hex corresponds to 0.5 V out of a maximum of 0.7 V in output video on each of the R, G and B channels. The predetermined thresholds are therefore typically set to 0.35 V, at the midpoint of the output voltage range of adaptor 70.

Figure 6:
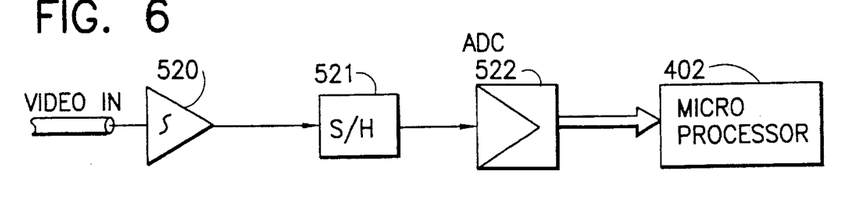
FIG. 6 is a block diagram of yet another activity detector of a display device of the present invention.

Referring now to FIG. 6, yet another preferred example of activity detector 403 comprises an integrator 520 having an input connected to a corresponding one of the video inputs R, G, and B. The output of integrator 520 is connected to the input of a Sample and Hold (S/H) stage 512. The output of S/H stage 521 is connected to the input of Analog to Digital Convertor (ADC) 522. ADC 522 has an N bit output connected to processor 402. In operation, integrator 520 is reset at the start of each frame by the frame sync pulse.

During each frame, the output of integrator 520 attains a final value just before the leading edge of the next frame sync pulse. At the end of each frame, S/H stage 521 stores the final value attained by integrator 520 during the previous frame. The final value stored by S/H stage 521 is converted by ADC 522 into an N-bit digital value. The N bit digital value at the output of ADC 522 is then read by processor 402. The same reset at the start of each frame and transfer at the end of each frame as hereinbefore described with reference to FIG. 5 are applicable to the arrangement of FIG. 6. In a modification of the activity detector of FIG. 6, each of the S/H stages corresponding to the video inputs R, G, and B are connectable to the input of a single ADC 522 via a multiplexor.

In a preferred modification to the arrangement of FIG. 4, ADC 522 is adapted to generate the N bit digital value in Gray code. Thus, no more than one bit in the N bit digital value changes at a time as the input to the ADC 522 is varied. This advantageously reduces the susceptibility of activity detector 403 to noise and temperature variations.

In the embodiment of the present invention described above with reference to FIG. 6, integrator 520 was configured to attain a final value at the end of each frame of input video. However, it will be appreciated that in other embodiments of the present invention, integrator 520 may be configured to attain a final value which is sampled by S/H stage 512 and encoded by ADC 522 over a predetermined line or group of lines.

Figure 7:
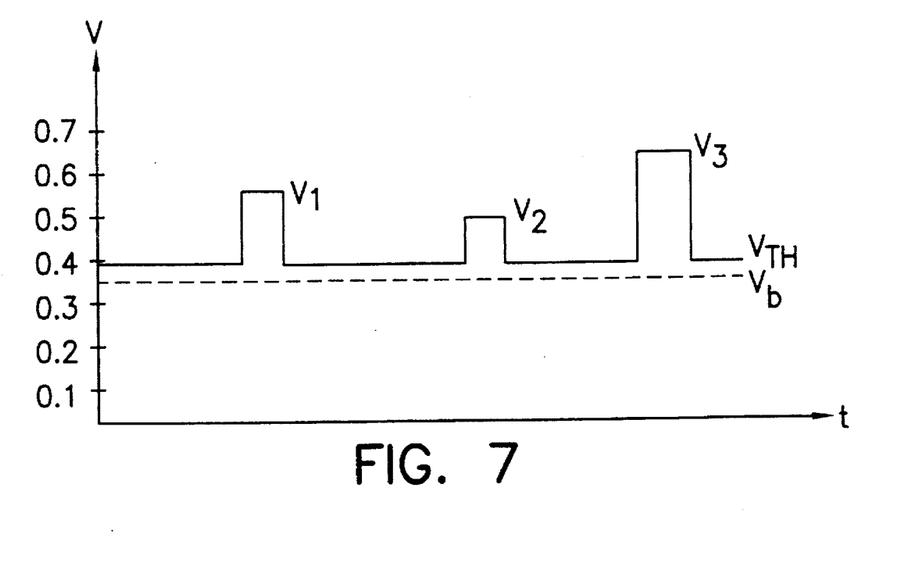
FIG. 7 is a signal diagram corresponding to a typical input video signal.

Referring back to FIGS. 4 and 5, and in particular to thresholding circuit 500, in many cases a single threshold level is sufficient to provide adequate power management in display device 130. However, there are some cases where a single threshold may be insufficient to ensure reliable power management. Referring now to FIG. 7, a video signal V input to display device 130 may define a screen background of constant brightness Vb against which any text is highlighted at V1, V2 V3 for example. The highlighted text may, for example, bring status changes to the attention of the user. If the background brightness level Vb is above the threshold, 0.35 V for example, of thresholding circuit 500, no transitions are detected at the input of counter 501 in FIG. 4 or register 510 in FIG. 5 despite any changes to the screen content superimposed on the relatively high brightness background.

Figure 8:
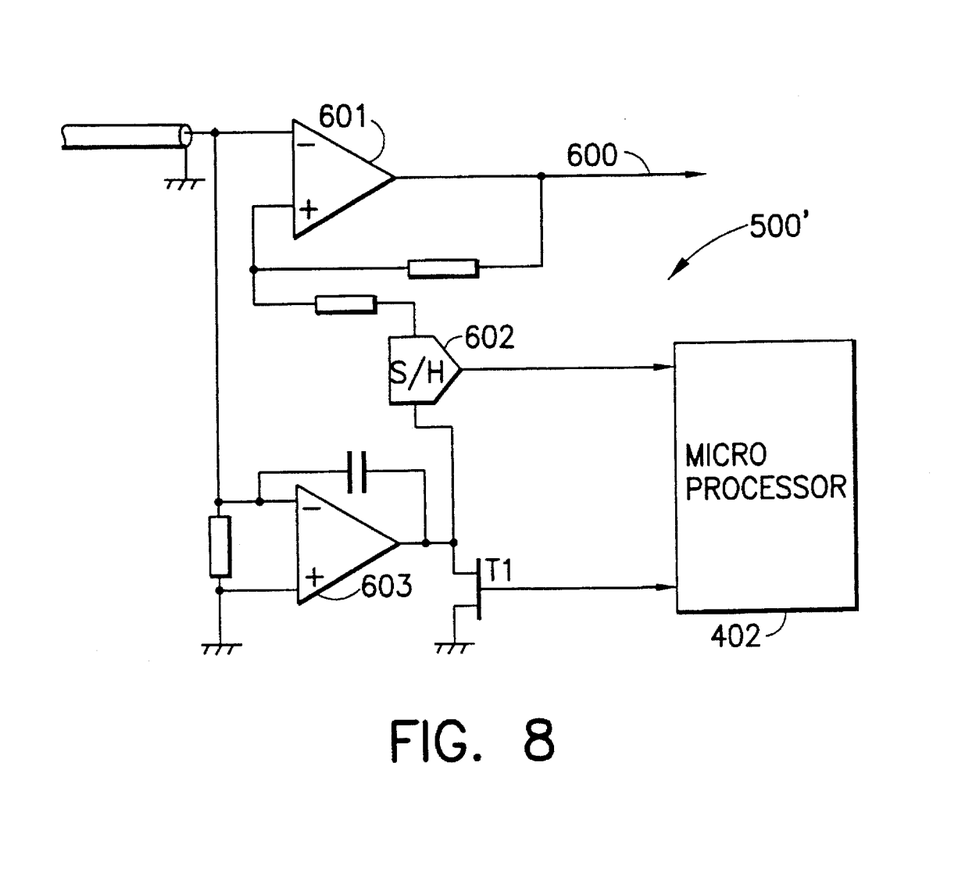
FIG. 8 is a circuit diagram of a thresholding circuit of the for an activity detector of a display device of the present invention.

Referring now to FIG. 8, a preferred thresholding circuit 500' comprises a fast comparator 601 having an output 600 connected to the input of counter 501 in FIG. 4 or shift register 510 in FIG. 5. The negative input of comparator 601 is connected to an input video signal, R, G or B. The positive input of comparator 601 is connected to the output of comparator 601 to provide positive feedback. The positive input of comparator 601 is also connected to the output of a sample and hold (S/H) circuit 602. The output of an operational amplifier configured as an integrator 603 is connected to the input of S/H circuit 602. The control input of S/H circuit 602 is connected to processor 402. The input to integrator 603 is connected to the input video R, G or B. The output of integrator 603 is connectable to ground via a field effect transistor switch T1. The gate of T1 is connected to processor 402. In operation, integrator 603 integrates each frame of input video signal, R, G or B, to generate a mean voltage level representative of the picture content of each frame. S/H circuit 602 holds the mean level determined by integrator 603 at the end of the previous frame while integrator 603 determines the mean level corresponding to the present frame. Via the control input of S/H circuit 602, processor 402 triggers transfer of the output of integrator 603 to the output of S/H circuit 602 at the the end of each frame. The level held in S/H circuit 602 determines the threshold of comparator 601. After triggering S/H circuit 602 to sample and hold the output of integrator 603 at the end of each frame, processor 402 resets integrator 603 by turning on T1. The positive feedback loop of comparator 601 provides hysteresis to prevent multiple transitions at the output 600 of comparator 601 when the threshold of comparator 601 is crossed by the input video R, G or B. The hysteresis also prevents spurious transitions at the output 600 of comparator 601 in response to jitter in the video DACs of adaptor 70.

Figure 9:
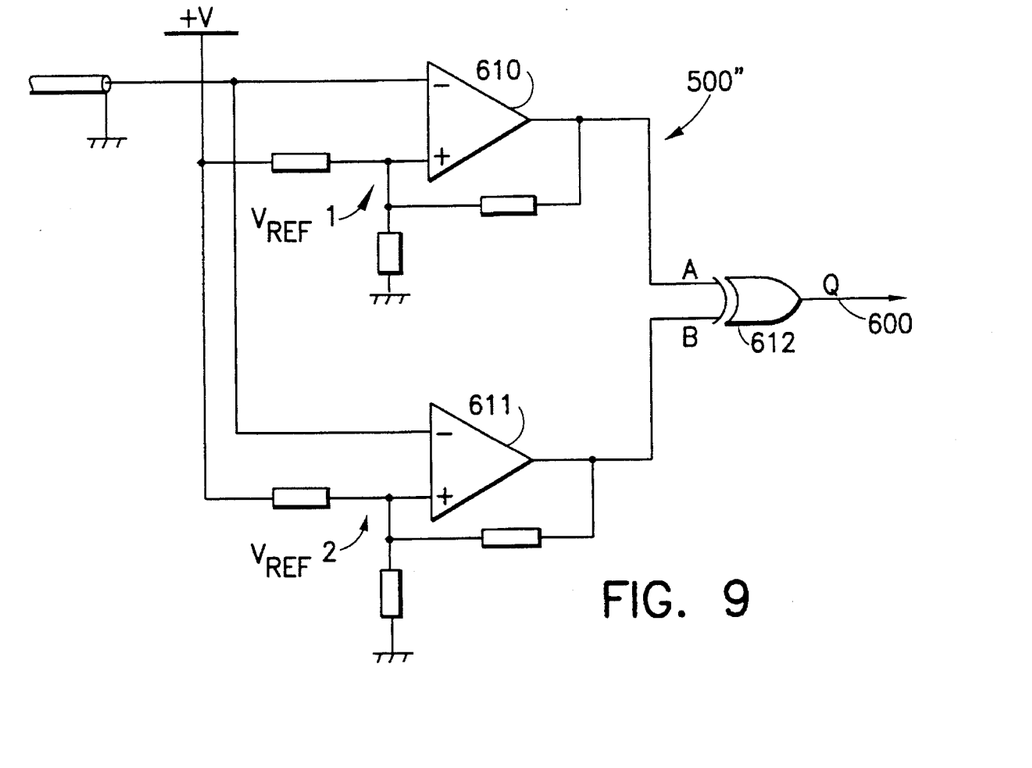
FIG. 9 is a circuit diagram of another thresholding circuit of the for an activity detector of a display device of the present invention.
Figure 10:
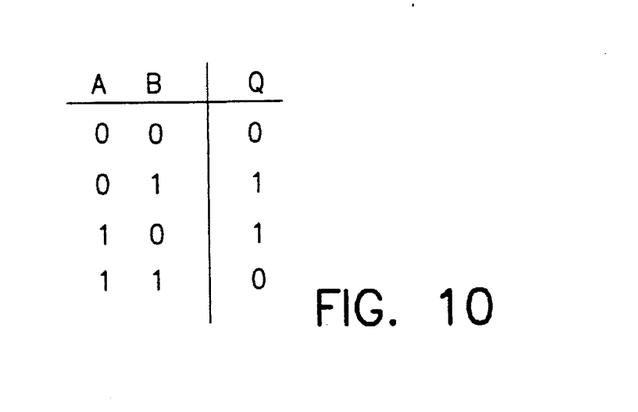
FIG. 10 is a truth table corresponding to the thresholding circuit of FIG. 9.

Referring now to FIG. 9, another preferred thresholding circuit 500" comprises two comparators 610 and 611 each having different thresholds determined respectively by Vref1 and Vref2. The negative inputs of comparators 610 and 611 are connected to the input video R, G, or B. The outputs of comparators are each connected to a different input of a two input Exclusive Or (EOR) gate 612. The output 600 of EOR gate 612 is connected to the input of counter 501 in the activity detector of FIG. 4 or to the input of shift register 510 in the activity detector of FIG. 5. The positive inputs of comparators 610 and 611 are connected via potential dividers to a reference voltage +V. With reference to FIG. 10, in operation output (Q) 600 of EOR gate 612 only goes high if either input A from comparator 610 or input B from comparator 611 go high, but not if both A and B are simultaneously high. The thresholding circuit of FIG. 9 will now be described in operation with reference to the signal diagrams of FIGS. 11 to 14.

Figure 11:
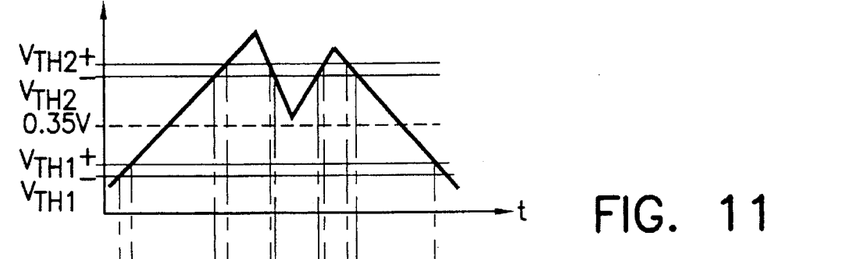
FIG. 11 is a signal diagram corresponding to another typical input video signal.
Figure 12:
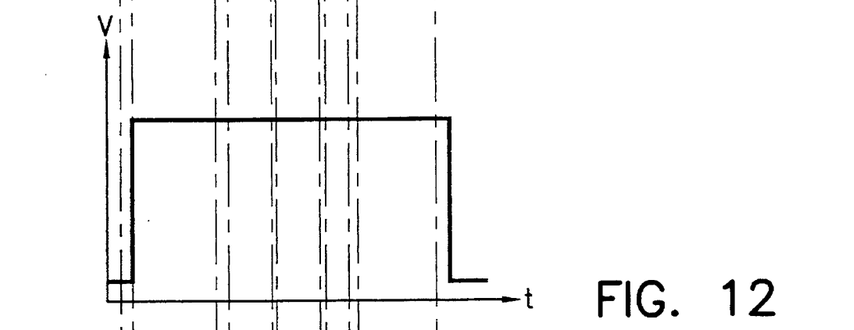
FIGS. 12 to 14 are signal diagrams corresponding to the thresholding circuit of FIG. 9.
Figure 13:
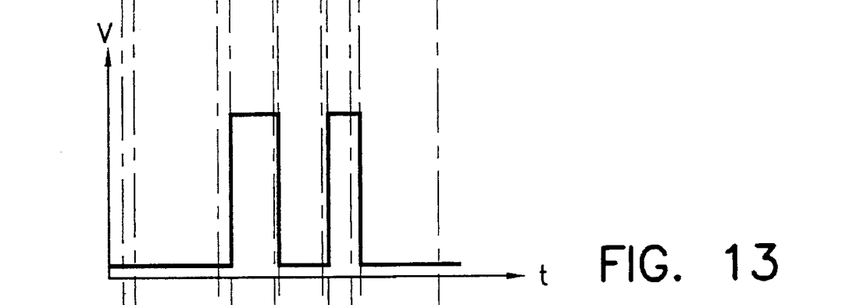
Figure 14:
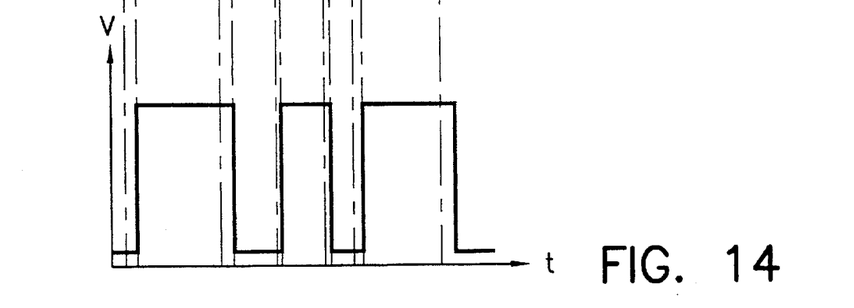

Referring to FIG. 11, threshold levels Vth1+ and Vth1− are the hysteresis threshold levels of comparator 611 as set by Vref2. Threshold levels Vth2+ and Vth2− are the hysteresis threshold levels of comparator 610 as set by Vref1. Depicted in FIG. 11 for comparison is the aforementioned 0.35 V single threshold level of the thresholding circuit 500 hereinbefore described with reference to FIG. 4. Video signal V(t) includes positive slopes S1 and S3 and negative slopes S2 and S4. Thresholding circuit 500 would not detect slope S2 and S3 because slopes s2 and S3 do not intercept the 0.35 V threshold. Turning to FIG. 12, the output of comparator 611 (input B to gate 612) goes high when positive slope S1 crosses threshold level Vth1+ and returns low when negative slope S4 crosses threshold Vth1−. With reference to FIG. 3, the output of comparator 610 (input A to gate 612) goes high when positive slope S1 crosses Vth2+ and returns low when negative slope S2 crosses Vth2−. The output of comparator 610 goes high again when positive slope S3 crosses threshold Vth2+ and returns low again when negative slope S4 crosses threshold Vth2−. Turning to FIG. 14, the output Q of gate 612 is thus indicative of all transitions in the video signal. Referring back to FIG. 10, it will be appreciated that the state in the truth-table of gate 612 where input A is high and input B is low is an impossible state because Vth1+ and Vth1− and lower than Vth2+ and Vth2−.

Referring again to FIG. 3, in operation, activity detector 402, as hereinbefore described, produces a digital output for each frame of R, G and B input video. Each of the digital outputs is determined by the respective contents of each of the corresponding R, G and B frames of input video. Processor 402 monitors the digital outputs produced by activity detector 402. If the digital outputs change between successive frames of input video, processor 402 stores the new digital outputs in memory 404. If processor 402 detects no change in the digital outputs between successive frames, then the values currently stored in memory 404 are maintained. It will be appreciated that for interlaced display formats, processor 402 monitors the digital outputs corresponding to every other frame. Timer 405 comprises a counter (not shown). In operation, the counter of timer 405 increments a clock count in response to pulses of a clock signal. Processor 402 resets timer 405 upon detection of a change in any of the digital outputs from activity detector 403 between successive frames. Otherwise, the count stored in timer 405 continues to increment. If the count stored in timer 405 reaches a predetermined threshold level, timer 405 sends an interrupt to processor 402. It will be appreciated that, in other embodiments of the present invention, timer 405 may be implemented by a resettable monostable circuit or the like instead of a counter. It will also be appreciated with reference back to the activity detector of FIG. 5 that the CRCs generated by each of the video inputs R, G and B may be combined to produce a single composite CRC per frame at processor 402.

In the arrangement described in the preceding paragraph, the contents of memory 404 is updated, and timer 405 is reset, upon detection of a change from one frame to the next in any one of the digital outputs corresponding to R, G and B input video. However, in some applications, such as for example where the displayed picture includes a flashing cursor, the absolute detection arrangement described above is not desirable because the flashing cursor resets timer 405, thereby obstructing power management. A flashing cursor typically flashes with 50% duty cycle at a fixed frequency. In general, such a cursor occupies one character box (8 pixels) in width. Generally, such a cursor is two lines in height in normal operation and up to one character box in height when the "insert" key on keyboard 110 is actuated.

In another arrangement of the present invention, processor 402 only updates the contents of memory 404 and resets timer 405 upon detection of a change from one frame to the next in any one of ratios R:G, R:B, and B:G of the digital outputs corresponding to the R, G, and B input video. This ratiometric detection arrangement is suitable for providing power management with applications that generate a flashing white cursor because the ratios of digital outputs corresponding to a frame without the cursor are the same as the ratios of digital outputs corresponding to a successive frame with the cursor. Therefore, timer 405 is not reset by the cursor flashing on and off between successive frames. Timer 405 is only reset if there is a substantive change in the colour information contained in successive frames of input video.

In yet another arrangement of the present invention, processor 402 only updates the contents of memory 404 and resets timer 405 upon detection of a change of at least a predetermined step in video activity from one frame to the next in any one of the digital outputs corresponding to the R, G, and B video. The predetermined step is selected as a function of the timer period after which timer 405 interrupts processor 402. For example, if during the timer period, very small levels of video activity between adjacent frames are detected such as, for example, a flashing cursor or hands moving on a clock-face then timer 405 is not reset. Such levels of video activity typically correspond to a difference of 4 transitions between adjacent frames each having the order of around 10,000 transitions. It will be appreciated that this arrangement may be modified to provide the user with a manual control for varying the predetermined step according to application. Referring back to FIG. 4, a typical video representation of the character "H" causes the count recorded in counter 501 to change by 20. This so-called "fuzzy" logic technique is especially useful for optimising power management where processor 402 is connected to either the activity of FIG. 4 or a non-Gray-coded ADC in the activity detector of FIG. 6.

Figure 15:
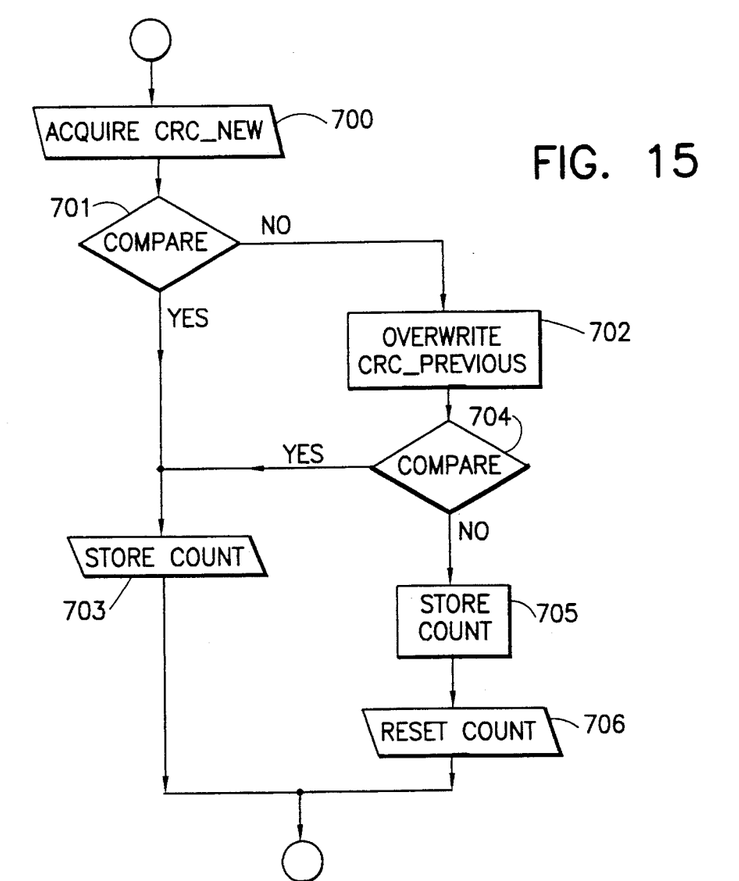
FIG. 15 is a flow diagram of a cursor filtering method for use with the activity detector of FIG. 5.

Referring now to FIG. 15, in still another arrangement of the present invention, processor 402 is configured by a cursor filtering algorithm for processing CRCs generated by the FIG. 5 embodiment of activity detector 403. The algorithm has four variables: CRCnew; CRCprevious; CRCt; and CRCt-1. CRCnew is the CRC determined by the present frame of video inputs R, G and B in combination. CRC previous is the CRC determined by the previous frame of video inputs. CRCt is the CRC generated when the cursor is is an on state. CRCt-1 is the CRC generated when the cursor is in another state such as, for example, partially drawn or off. At step 700, processor 402 acquires CRCnew from shift register 510. At step 701, processor 402 compares CRC new with CRCprevious. If CRCnew is the same as CRC previous, at step 703, the count stored in timer 405 is incremented and the algorithm returns to step 700 ready to receive CRCnew corresponding to the next frame. If CRC new is not the same as CRCprevious, at step 702, processor 402 overwrites CRCprevious with CRCnew. Then, at step 704, processor 402 compares CRCprevious with CRCt-1. If CRCprevious is the same as CRCt-1, then at step 705 the count stored in timer 405 is incremented. If CRCprevious is not the same as CRCt-1, then at step 705 processor 402 overwrites CRCt-1 with CRCt and overwrites CRCt with CRCprevious. If at step 704, processor 402 determines that CRCprevious is not the same of CRC t-1, CRC previous indicates that the corresponding frame contains new screen data instead of just a flashing cursor. Therefore, at step 706, processor 402 resets the count stored in timer 405. By storing both a CRC from a frame with the cursor on and a CRC from a frame with the cursor off, absolute time dependency can be removed from the cursor filtering algorithm of the present invention. Therefore, the cursor filtering algorithm of the present invention can be used to filter cursors with various flashing frequencies and flashing duty cycles. Aliasing permits cursors with flashing frequencies above the frame rate to be filtered.

In a further arrangement of the present invention, processor 402 is configured by another cursor filtering algorithm for processing CRCs generated by the FIG. 5 embodiment of activity detector 403. This algorithm monitors CRCs from successive frames of input video and determines any periodicity in the CRCs over a predetermined time interval of 5 seconds, for example, in accordance with industry standards for power management such as the NUTEK standard. If a periodicity in the CRCs is not detected by the end of the time interval, processor 402 resets the count stored in timer 405. If a periodicity in the CRCs is detected at the end of the time interval, processor 402 increments the count stored in timer 405.

Referring back to FIG. 1, the line and frame refresh rates of display 130 are not generally synchronised to the updating of video signals R, G and B by system unit 5. Therefore, when a cursor is written or erased by system unit 5, there may be one or more frames with a partially written cursor displayed by display device 130. In still further arrangement of the present invention, the cursor filtering algorithm configures processor 402 to ignore the first frame in which a change in video content is identified and to accept the next and subsequent frame for the purposes of cursor filtering. This ensures that the cursor is fully written before the cursor filtering is applied. It will be appreciated that the aforementioned cursor filtering techniques can be applied in any periodic cycling in input video activity Referring now to FIG. 16, in a further arrangement of the present invention, display 130 includes a line store 800 connected to processor 402. Line store 800 is capable of storing two complete frames of input video transitions. A typical high resolution display picture comprises 768 lines each having 512 video transitions in each video channel, R, G or B. Therefore, to facilitate storage of two frames of video transitions corresponding to this display mode, line store 800 has a capacity of at least 2 (frames)×768 (lines)×9 (bits for 512 transitions)×3 (colours R, G and B)=41,472 bits. In a particularly preferred arrangement, line store 800 is implemented by a 64 kbit dynamic random access memory (DRAM) chip. In operation, processor 402 stores video transitions corresponding to successive pairs of frames of input video, R, G, and B, in line store 800. For each pair of frames stored in line store 800, processor 402 sequentially compares successive lines of one stored frame with the corresponding lines of the other stored frame according to an Exclusive Or function. Processor 402 identifies a cursor by determining from the Exclusive Or function that there are between two and sixteen consecutive lines having the same transitions. Processor 402 determines that no cursor is present if it cannot detect between two and sixteen consecutive lines having the same transitions, Upon receipt of the interrupt from timer 405, processor 402 deactivates the high power portions of display circuitry 401, thereby reducing the power consumption of display device 130 during dormant periods. Where output device 400 is a CRT, the high power portions of drive circuitry 401 typically include the line and frame deflection circuitry, the anode voltage generator, the video amplifier, and the portion of the power supply supplying these. When a subsequent change in screen content is detected, processor 402 resets timer 405 and reactivates display circuitry 401. Display device 130 is thus brought out of low power "standby mode" in response to change in screen content. Output device 400 is reactivated by reactivated display circuitry 401 to display the changed screen content.

Figure 16:
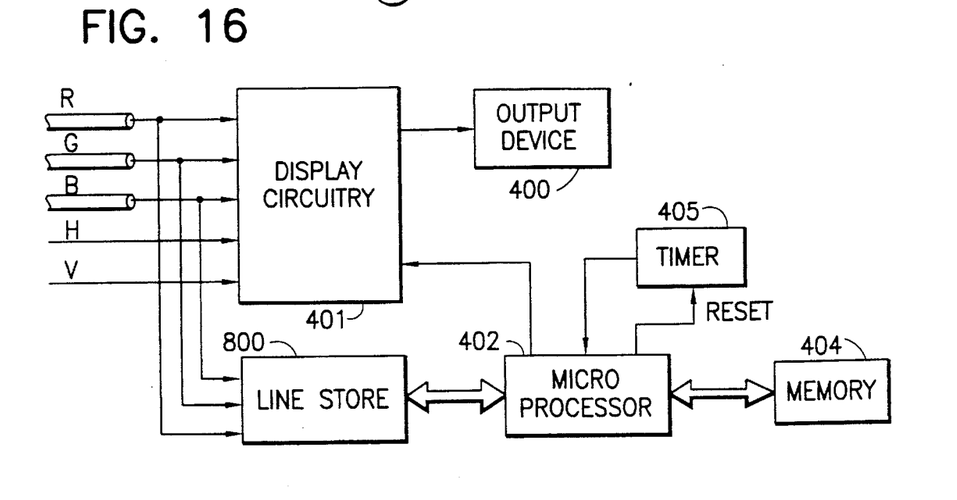
FIG. 16 is a block diagram of yet another display device of the present invention.

In a preferred modification to the present invention, multiple levels of power management are provided in display device 130 by providing timer 405 with multiple outputs each connected to an interrupt of processor 401. The outputs of timer 405 are sequentially triggered in response to progressively longer preset time periods elapsing since the last screen update detected by processor 402. Each output from timer 405 triggers processor 402 to deactivate a different portion of display circuitry 401, thereby progressively deactivating display device 130 until only the lowest power portions of display device 130, such as processor 402, activity detector 403, timer 405, and memory 404 remain active. Upon detection of a screen update, processor 402 reactivates display circuitry 401 to display the new screen content on output device 400. Timer 405 comprises a counter having multiple stages, each stage having an output connected to an interrupt of processor 402. However, it will be appreciated that in other embodiments of the present invention, timer 405 may, for example, comprise a plurality of monostable circuits each connected to an interrupt of processor 402 and each having a different time constant.

In a further modification of the present invention, display device 130 is provided with an indicator, such as a light emitting diode (LED) or the like, and a manually operable push button cancel control, both connected to processor 402. Before deactivating display circuitry 401 in response to an interrupt from timer 405, processor 402 flashes the indicator to warn the user that display circuitry 401 is about to deactivated. A predetermined time interval thereafter, processor 402 deactivates display circuitry 401 unless the cancel is pushed by the user. Processor 402 detects depression of the cancel button and resets timer 405. Display circuitry 401 thus remains active. It will be appreciated that display device 130 may also include an audible indicator such as a buzzer to augment the warning provided by the flashing indicator. The cancel control may be of a two position type to disable the power management function provided by processor 402 if necessary.

Examples of the present invention have been hereinbefore described with reference to a colour display device. It will, however, be appreciated that the present invention is equally applicable to monochrome display devices.

We claim:

1. Display apparatus comprising: a display screen; and a drive circuit for receiving an input video signal, the drive circuit being connected to the display screen to generate an image on the display screen in response to the input video signal; characterised in that the apparatus comprises: a timer for generating a count in response to a clock signal; a detector for receiving the input video signal and for resetting the timer on detection of a change in image content between successive frames of the input video signal; and control means connected to the timer and to the drive circuit for at least partially disabling the drive circuit in response to the count stored in the timer exceeding a predetermined threshold, wherein the detector comprises:

thresholding means for providing a video signal threshold level and for generating a pulse signal including a plurality of pulses in response to transitions in the input video signal crossing the predetermined video signal threshold; a counter for counting the pulses of the pulse signal to generate a pulse count indicative of the number of transitions in the input video signal; means for resetting the counter at the beginning of each frame of video signal; a microprocessor connected to the counter and including a memory unit for storing pulse counts and a comparator for comparing the pulse count in the counter at the end of a first frame of the input video signal with the pulse count in the counter at the end of the next frame of the input video signal; and means for resetting the timer if the comparator determines that the pulse counts corresponding to successive frames of the input video signal are different.

2. Apparatus as claimed in claim 1, wherein the thresholding means comprises a plurality of comparators each for generating an output signal in response to transitions in the input video signal crossing a different threshold level, and an exclusive or gate for generating the pulse signal as a function of a combination of the output signals from the comparators.

3. Apparatus as claimed in claim 2, wherein the thresholding means comprises first comparator means for generating a first signal in response to transitions in the video signal across a first predetermined threshold, second comparator means for generating a second signal in response to transitions in the video signals across a second predetermined threshold level lower than the first predetermined threshold level, and an exclusive or gate for generating the pulse signal as a function of a combination of the first and second signals.

4. A computer system comprising display apparatus as claimed in claim 1, a system unit for generating the input video signal to generate an image on the screen of the display apparatus, and a data input device for inputting data and commands to the system unit.

5. Display apparatus comprising: a display screen; and a drive circuit for receiving an input video signal, the drive circuit being connected to the display screen to generate an image on the display screen in response to the input video signal; characterised in that the apparatus comprises: a timer for generating a count in response to a clock signal; a detector for receiving the input video signal and for resetting the timer on detection of a change in image content between successive frames of the input video signal; and control means connected to the timer and to the drive circuit for at least partially disabling the drive circuit in response to the count stored in the timer exceeding a predetermined threshold, wherein the detector comprises: thresholding means for providing a video signal threshold level and for generating a pulse signal including a plurality of pulses in response to transitions in the input video signal crossing the predetermined threshold; a cyclic redundancy checksum generator including a shift register responsive to said plurality of pulses for generating a checksum signal in response to the plurality of pulses of the pulse signal from said thresholding means; means for resetting the checksum generator at the beginning of each frame of the input video signal; a microprocessor connected to the checksum generator and including a memory unit for storing checksums and a comparator for comparing the checksum generated by the checksum generator at the end of a first frame of the input video signal with the checksum generated by the checksum generator at the end of the next frame of the input video signal; and means for resetting the timer if the comparator determines that the checksums corresponding to successive frames of the input video signal are different.

6. Apparatus as claimed in claim 5, the detector further comprising: cursor filtering means for detecting a flashing cursor component of the input video signal as a function of the checksums corresponding to successive frames of the input video signal; and means for resetting the timer if the comparator of the microprocessor determines that the checksums corresponding to successive frames of the input video signal are different unless the difference between the checksum is determined by the cursor filtering means to correspond to a flashing cursor component of the input video signal.

7. Apparatus as claimed in claim 6, wherein the cursor filtering means identifies a flashing cursor component of the input video signal by detecting a periodicity in the checksums corresponding to successive frames of the input video signal.

8. Display apparatus comprising: a display screen; and a drive circuit for receiving an input video signal, the drive circuit being connected to the display screen to generate an image on the display screen in response to the input video signal; characterised in that the apparatus comprises: a timer for generating a count in response to a clock signal; a detector for receiving the input video signal and for resetting the timer on detection of a change in image content between successive frames of the input video signal; and control means connected to the timer and to the drive circuit for at least partially disabling the drive circuit in response to the count stored in the timer exceeding a predetermined threshold, wherein the detector comprises: an integrator for integrating the input video signal to generate an output level; an analog to digital convertor for generating a digital word as a function of the output level at the end of each frame of the input video signal; means for resetting the integrator at the beginning of each frame of the input video signal; and a microprocessor connected to the analog to digital convertor and including a memory unit for storing digital words and a comparator for comparing the digital word generated by the analog to digital convertor at the end of a first frame with the digital word generated by the analog to digital convertor at the end of the next frame; the detector resetting the timer if the comparator determines that the digital words corresponding to successive frames of the input video signal are different.

9. Apparatus as claimed in claim 8, wherein the analog to digital convertor is adapted to generate the digital word in Gray Code.

\* \* \* \* \*